United States Patent Office 3,520,799
Patented July 14, 1970

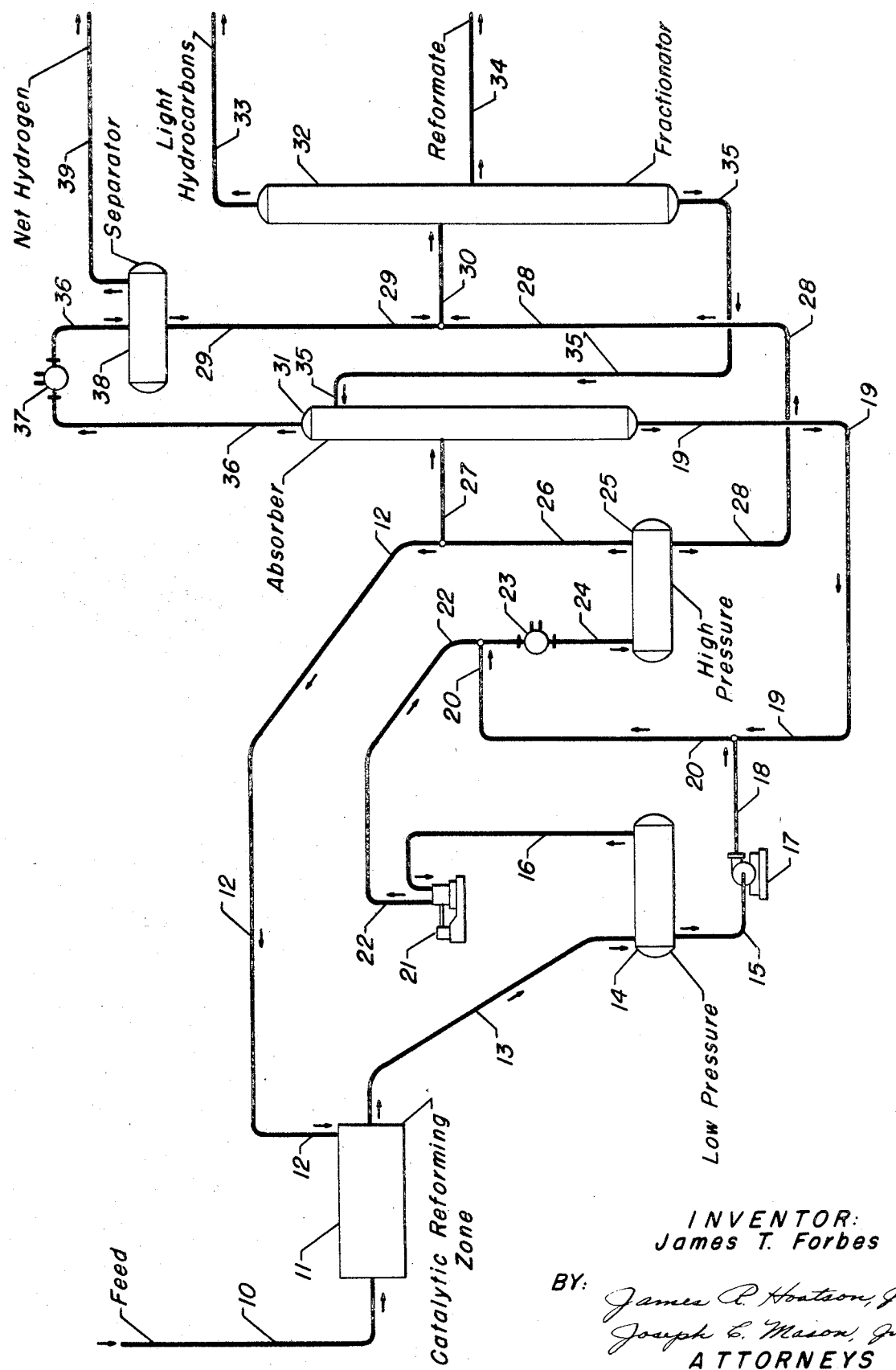

3,520,799
PURIFYING HYDROGEN SEPARATED FROM A CATALYTIC REFORMING EFFLUENT
James T. Forbes, Arlington Heights, Ill., assignor to Universal Oil Products Company, Des Plaines, Ill., a corporation of Illinois
Filed Sept. 30, 1968, Ser. No. 763,578
Int. Cl. C10g 35/04, 35/08
U.S. Cl. 208—101                                6 Claims

ABSTRACT OF THE DISCLOSURE

Process for the catalytic reforming of hydrocarbons in the presence of hydrogen, preferably, to produce high quality gasoline boiling range products. Relatively impure hydrogen for recycle purposes and for other uses is provided by compressing and contacting this hydrogen with a portion of the liquid phase reformed product. Processing technique permits maximum recovery of normally gaseous hydrocarbons as well as reformate.

BACKGROUND OF THE INVENTION

This invention relates to a method for the conversion of hydrocarbons. It also relates to a process for the dehydrogenation of hydrocarbons. It particularly relates to the catalytic reforming of hydrocarbons to produce gasoline boiling range products. It specifically relates to a method for upgrading the hydrogen gas for recycle to the catalytic reforming reaction zone and for purifying the net hydrogen gas stream which may be used in other hydrogen consuming reactions.

It is well known in the art that high quality gasoline boiling range products, such as aromatic hydrocarbons, e.g. benzene, toluene, and xylene, may be produced by the catalytic reforming process wherein naphtha-containing feedstocks are passed over platinum-containing catalyst in the presence of hydrogen in order to convert at least a portion of the feedstock into aromatic hydrocarbons. One of the predominant reactions in catalytic reforming involves dehydrogenation of naphthenic hydrocarbons. The dehydrogenation function produces a net excess of hydrogen from the process which is available for other uses, such as hydrodesulfurization reactions, and the like. A considerable portion of the produced hydrogen, however, is required for recycle purposes in order that a proper partial pressure of hydogen may be maintained over the catalyst in the catalytic reforming zone.

However, the catalytic reforming reaction also involves a hydrocracking function which segments hydrocarbons into relatively low molecular weight hydrocarbons, e.g. normally gaseous hydrocarbons, such as methane, ethane, propane, butane, etc. and, in particular, $C_2+$ hydrocarbons which then become contaminants in the gaseous hydrogen which is separated from the effluent of the reaction zone. These contaminants have the effect of lowering the hydrogen purity to such an extent that frequently external purification techniques must be used by those skilled in the art before the net hydrogen from the reformer can be used in other chemical reactions requiring relatively high purity hydrogen. Low hydrogen purity also has a significant effect on the reforming reaction by the way of requiring considerable quantities of such low purity hydrogen in order to maintain the hydrogen partial pressure in the reaction zone at the proper level, as previously mentioned.

As those skilled in the art are familiar, the reforming reaction must have a hydrogen atmosphere in order for the various desired reactions to take place. This means, of course, that the separated hydrogen gas referred to hereinabove must, to a considerable extent, be returned to the catalytic reforming zone. Due to the large pressure drop through a conventional catalytic reforming system, typically having a plurality of catalytic reactors and separation vessels, the separated gas for recycle purposes must be compressed to at least the pressure of the reaction zone before it can be returned and properly used. Heretofore, the size of the hydrogen gas compressed has been a significant cost factor in constructing and operating catalytic reforming units for the production of gasoline boiling range products, such as benzene, toluene, and xylene. In other words, the large horsepower requirement for the recycle hydrogen compressor is a substantial capital investment item and a substantial operating cost item for any catalytic reforming unit.

Still further, there has been a trend in the catalytic reforming technology which is predicated on the theory that the reforming reaction should be carried out at a relatively low pressure; that is, a reaction zone pressure of less than 200 p.s.i.g. Consequently, since the other hydrogen consuming reactions, such as hydrodesulfurization, are operated at pressures considerably above 200 p.s.i.g., there is associated with prior art processes the additional expense of compressing the net tail gas from a catalytic reformer up to the operating pressure of these other hydrogen consuming processes.

Consequently, it would be desirable to operate the catalytic reforming process so as to produce relatively high purity hydrogen not only for recycle purposes, but also for other uses outside the catalytic reforming system. Furthermore, it would be highly desirable to operate the catalytic reforming process in a more economical and facile manner while maintaining product quality and quantity at predetermined levels.

SUMMARY OF THE INVENTION

Therefore, it is an object of this invention to provide an improved method for the conversion of hydrocarbons in the presence of hydrogen.

It is another object of this invention to provide a method for the dehydrogenation of hydrocarbons.

It is a still further object of this invention to provide an improved method for the catalytic reforming of hydrocarbons to produce gasoline boiling range products in a facile and economical manner.

It is a particular object of this invention to provide a method for purifying the produced hydrogen from a catalytic reforming operation.

Accordingly, the present invention provides a method for the conversion of hydrocarbons in the presence of hydrogen which comprises: (a) contacting said hydrocarbons with a catalytic composite in the presence of hydrogen under conditions sufficient to produce an effluent stream containing hydrogen admixed with converted hydrocarbons; (b) separating said effluent at relatively low pressure into a gaseous stream comprising relatively impure hydrogen contaminated with light hydrocarbons and a liquid stream containing converted hydrocarbons; (c) comprising said gaseous stream to a relatively high pressure; (d) admixing the compressed gaseous stream with at least a portion of said liquid stream; (e) separating said admixture at said relatively high pressure into a gaseous fraction comprising hydrogen having a reduced contaminant content and a liquid fraction comprising converted products and containing part of said contaminants; (f) introducing a portion of said gaseous fraction of step (e) into a plural stage absorption zone in contact with a hereinafter specified lean absorber oil, said absorption zone maintained under conditions sufficient to produce a relatively pure hydrogen stream containing light hydrocarbons and a rich oil stream containing absorbed hydrocarbons; (g) chilling said relatively pure hydrogen stream under conditions sufficient to condense at least a portion of said light hydrocarbons thereby producing a first product stream comprising purified hydrogen; (h) passing said condensed hydrocarbons of step (g) and said liquid fraction of step (e) into a fractionation zone under conditions sufficient to produce a second product stream comprising light hydrocarbons, a third product stream comprising converted hydrocarbons, and a bottoms stream comprising heavy hydrocarbons; (i) returning the remaining portion of said gaseous fraction of step (e) to step (a) as at least part of said hydrogen; and, (j) passing at least a major portion of said bottoms fraction of step (h) into said absorption zone as the specified lean oil.

Another embodiment of this invention includes the method hereinabove wherein said relatively high pressure is at least 50 p.s.i.g. higher than said relatively low pressure.

A still further embodiment of this invention includes the method hereinabove wherein said relatively low pressure is from 85 p.s.i.g. to 200 p.s.i.g.

DETAILED DESCRIPTION OF THE INVENTION

The art of catalytic reforming and the broad art of dehydrogenation of hydrocarbons is well known to those skilled in the art and need not be discussed in great detail herein. However, in brief, suitable charge stocks for use in the catalytic reforming operation to produce gasoline boiling range products, such as aromatic hydrocarbons are those which contain both naphthenes and paraffins in relatively high concentration. Such feedstocks include narrow boiling range fractions, such as naphtha fractions, as well as substantially pure materials, such as cyclohexane, methylcyclohexane, and the like. The preferred class of suitable feedstocks for the catalytic reforming operation includes primarily straight-run gasolines, such as the light and heavy naphtha. It is distinctly preferred to use a naphtha fraction boiling between, say, 90° F. and 450° F. as the feedstock to the catalytic reforming operation.

The preferred types of catalyst for use in the catalytic reforming process are well known to those skilled in the art and, typically, comprise platinum or an alumina support. These catalyst may contain substantial amounts of platinum, but for economic and quality reasons, the platinum will, typically, be within the range from 0.05% to 5.0% by weight platinum.

Satisfactory operating conditions for the catalytic reforming operation include the presence of the hereinabove mentioned catalysts and temperatures of about 500° F. to about 1050° F., preferably, from 600° F. to 1000° F.; pressures from about 50 p.s.i.g. to about 1200 p.s.i.g., preferably from about 100 p.s.i.g. to 300 p.s.i.g.; a weight hourly space velocity within the range from about 0.2 to 40; and the presence of a hydrogen-containing gas equivalent to a hydrogen to hydrocarbon mol ratio of about 0.5 to about 15.0.

Conventionally, the catalytic reforming operation is carried out in a fixed bed reaction zone. Usually a plurality of catalyst beds are also used either in stacked fashion within a single reactor shell or, more preferably, in separate reactors. A single reactor with a single catalyst bed may be utilized, but, preferably a plurality of catalyst beds are used. Still more preferably, in the practice of this invention from 2 to 5 catalyst beds maintained in separate reactor vessels are utilized. As an example, four (4) separate reactor beds are used to illustrate the preferred embodiment of this invention.

The amount of catalyst used in each reactor bed may be varied considerably depending upon the characteristics of the feed stock and the purpose for which the conversion reaction is carried out. In the preferred embodiment of this invention, for example, the catalyst may be deposed in the separate reactors in the following manner: 10%, 15%, 25%, and 50% by weight catalyst, respectively. Other variations of reactor geometry and catalyst volume will be evident to those skilled in the art from general knowledge and the specific teachings presented herein.

In the practice of this invention, it is distinctly preferred that the relatively high pressure be at least 50 p.s.i.g. greater than the relatively low pressure. In other aspects, it is distinctly preferred that the catalytic reforming reaction be carried out at the lower end of the pressure scale rather than at the higher end, to wit: from 85 p.s.i.g. to 200 p.s.i.g. Although not mentioned in detail, it is to be noted that the liquid phase from the relatively low pressure separation zone will have to be pumped into the relatively high pressure discharge line from the compressor so that the separation can be made at the relatively high pressure.

The unique features of this invention may be best understood by a comparison with well known prior art schemes. Normally, the prior art scheme will operate the catalytic reforming operation at 300 to 450 p.s.i.g. The separator following the reaction zone is at substantially the same pressure, allowing for pressure drop through the system. The prior art scheme separates the hydrogen-containing phase from this separator and, generally, passes a portion of this hydrogen back to the reaction zone. Since the entire catalytic reforming system has significant pressure drop, this recycle hydrogen gas stream must be compressed in order to overcome the pressure drop. The desired reformed product or reformate according to the prior art schemes is removed from the same separator and passed into recovery means, such as a solvent extraction system. With reference to the description of this invention, it can be seen that the present invention has at least the added features of compressing the gaseous stream, admixing the compressed gas, preferably with all of the liquid product, and then making an additional separation of the hydrogen gas at relatively high pressure. More unique, however, the present invention takes the net hydrogen gas at this relatively high pressure and introduces it into a vapor-liquid plural stage absorption zone maintained under absorption conditions. A net gaseous stream from the absorber is now cooled to within a critical temperature range. The cooled net hydrogen stream is then further separated into a purified hydrogen product stream for use in other processes and a liquid stream which is commingled with other liquid products and sent into a fractionation zone for the recovery of the desired light hydrocarbons and reformate. The bottoms from the recovery zone comprises the lean absorption oil which is then passed into the plural stage absorber, previously mentioned. The combined effect, according to this invention, of compressing, contacting, absorbing, and cooling successively removes a significant portion of the hydrocarbon contaminants from the hydrogen gas stream without increasing either capital investment costs or operating expenses to any significant extent.

The invention may be more fully understood with reference to the appended drawing which is a schematic representation of apparatus for practicing one embodiment of the present invention.

DESCRIPTION OF THE DRAWING

A petroleum-derived naphtha fraction is introduced via line 10 into catalytic reforming zone 11 which contains a platinum catalyst and is operated under conventional reforming conditions including the relatively low pressure as previously mentioned. To illustrate the mechanics of this invention, however, the operating pressure of catalytic reforming zone 11 is chosen to be at about 175 p.s.i.g. at the inlet to the catalytic reactors. The total effluent from the catalytic reforming zone is withdrawn via line 13, cooled by means of condensers not shown, and passed into low pressure separation zone 14 at a pressure of about 100 p.s.i.g.

The pressure of separation zone 14 is deemed to be substantially that maintained in reaction zone 11, although, it is actually at a lower than reaction pressure due to the pressure drop through the system. Sufficient separation means, including residence time, is imposed on zone 14 so that a relatively impure hydrogen stream is separated via line 16 and a predominantly liquid product stream is separated and removed via line 15. The material in line 15 contains the reformed hydrocarbons, to wit: gasoline boiling range hydrocarbons, such as benzene, toluene, and xylene.

The relatively impure hydrogen-containing stream in line 16 is passed into compressor 21 wherein the pressure is raised at least 50 p.s.i. and, preferably, to about 220 p.s.i.g. The liquid material in line 15 is pumped by means of pump 17 into discharge line 18, admixed with hereinafter specified liquid material from line 19, and the combined liquid mixture pumped into the discharge line 22 from compressor 21. The mixture of compressed hydrogen and the liquid hydrocarbons is then passed via line 22 into cooler 23. The cooled and compressed liquid hydrocarbons and hydrogen as well as the contained contaminating portions of normally gaseous hydrocarbons are next passed into relatively high pressure separation zone 25 via line 24.

Suitable conditions are maintained in high pressure separation zone 25 sufficient to yield a gaseous stream comprising hydrogen having reduced contaminant content which is removed via line 26 and to yield a liquid stream containing reformed hydrocarbons plus a portion of the hydrocarbon contaminants, which stream is removed from separator 25 via line 28.

A portion of the upgraded hydrogen stream in line 26 is recycled to catalytic reforming zone via line 12. The remainder of the ungraded hydrogen stream is passed via line 27 into absorber 31 in contact with hereinafter specified lean absorber oil from line 35.

Satisfactory operating conditions for absorber 31 include an average temperature of from about 90° F. to 150° F. In absorber 31 the hydrogen gas stream containing significant amounts of light hydrocarbons, passes upwardly through plural contacting stages and is scrubbed by the downward passing relatively heavy hydrocarbons which have been previously introduced from line 35. This absorption operation further purifies the hydrogen gas so that a relatively pure hydrogen stream is withdrawn from absorber 31 via line 36.

The rich absorber oil is withdrawn from the lower end of absorber 31, increased in pressure via a pump not shown and passed through line 19 into admixture with the liquid stream from separator 14 in line 18, and in further admixture with the compressed relatively high pressure impure hydrogen stream in line 22 as previously mentioned.

The relatively pure hydrogen stream in line 36 is now passed into chiller 37 under conditions sufficient to reduce the temperature of this hydrogen stream to a temperature from 0° F. to 65° F. which temperature being at least 20° F. lower than the temperature maintained in absorber 31. The chilled hydrogen stream is passed from cooler 37 into separation zone 38 which is maintained under conditions sufficient to produce a net purified hydrogen product stream which is removed via line 39 for other uses which require hydrogen, such as a hydrodesulfurization reaction. A liquid stream containing $C_6+$ hydrocarbons is also separated in separation zone 38 and this liquid stream is passed via line 29 into admixture with the high pressure liquid stream in line 28. The resulting mixture is then passed via line 30 into fractionator 32 which is maintained under a pressure from 250 p.s.i.g. to 300 p.s.i.g., a top temperature of from 170° F. to 300° F., and a bottoms temperature from 300° F. to 500° F. Under these conditions and overhead fraction is removed from column 32 via line 33 which comprises net light hydrocarbons which are recovered as a separate product stream. A lower side-cut fraction comprising reformate or the relatively high quality boiling range product is withdrawn via line 34. A bottoms product stream comprising primarily $C_6+$ hydrocarbons is withdrawn via line 35 and is utilized as the lean absorber oil in absorber 31, as previously mentioned.

The following examples are furnished to demonstrate some of the benefits to be achieved by the practice of the present invention.

Example I

A commercial scale catalytic reforming plant was designed to process a naphtha feedstock. The following data illustrates the composition of the various streams which may be separated in accordance with the present invention. All numbers shown are in mols per hour and reference should be made to the appended drawing for applicable line numbers.

| | Line No. | | | | | | | |
|---|---|---|---|---|---|---|---|---|
| | 13 | 15 | 16 | 19 | 24 | 28 | 12 | 27 |
| Component, mols/hr.: | | | | | | | | |
| $H_2$ | 11,244.2 | 4.9 | 11,239.3 | 10.0 | 11,254.2 | 22.0 | 9,350.2 | 1,882.1 |
| $C_1$ | 915.7 | 3.2 | 912.5 | 5.7 | 921.4 | 13.9 | 755.4 | 152.0 |
| $C_2$ | 702.5 | 10.2 | 692.3 | 16.9 | 719.4 | 43.1 | 563.0 | 113.3 |
| $C_3$ | 553.7 | 25.6 | 528.1 | 36.9 | 590.6 | 101.4 | 407.2 | 82.0 |
| $iC_4$ | 132.5 | 14.5 | 118.0 | 14.1 | 146.6 | 50.2 | 80.3 | 16.2 |
| $nC_4$ | 169.9 | 24.4 | 145.5 | 17.4 | 187.3 | 77.8 | 91.2 | 18.4 |
| $iC_5$ | 96.3 | 28.8 | 67.5 | 6.1 | 102.4 | 65.8 | 30.5 | 6.1 |
| $nC_5$ | 59.8 | 21.1 | 38.7 | 3.2 | 63.0 | 43.8 | 16.0 | 3.2 |
| $C_6+$ | 1,409.9 | 1,188.0 | 221.9 | 1,335.0 | 2,744.9 | 2,631.9 | 95.0 | 19.1 |
| Total | 15,284.5 | 1,320.7 | 13,963.8 | 1,445.3 | 16,729.8 | 3,049.9 | 11,388.8 | 2,292.4 |
| Lb./hr | 248,758 | 135,989 | 112,769 | 136,835 | 385,593 | 280,019 | 87,926 | 17,648 |
| Mol. Wt | 16.3 | 92.4 | 8.2 | 94.7 | 23.0 | 91.8 | 7.7 | 7.7 |
| B.p.s.d | | 11,850 | | 11,617 | | 24,244 | | |
| Lb/gal | | 6.54 | | 6.74 | | 6.58 | | |
| $10^6$ s.c.f.d | | | 125.7 | | | | 103.7 | 20.7 |

| | Line No. | | | | | | |
|---|---|---|---|---|---|---|---|
| | 35 | 36 | 39 | 29 | 30 | 33 | 34 |
| Component, mols/hr.: | | | | | | | |
| $H_2$ | | 1,872.1 | 1,872.0 | 0.1 | 22.1 | 22.1 | |
| $C_1$ | | 146.3 | 146.2 | 0.1 | 14.0 | 14.0 | |
| $C_2$ | | 96.4 | 96.2 | 0.2 | 43.3 | 43.3 | |
| $C_3$ | | 45.1 | 44.6 | 0.5 | 101.9 | 101.9 | |
| $iC_4$ | | 2.1 | 2.0 | 0.1 | 50.3 | 50.3 | |
| $nC_4$ | | 0.9 | 0.9 | | 77.8 | 63.8 | 14.0 |
| $iC_5$ | | | | | 65.8 | 1.9 | 63.9 |
| $nC_5$ | | | | | 43.8 | 1.0 | 42.8 |
| $C_6+$ | 1,340.1 | 24.2 | 9.0 | 15.2 | 2,647.1 | | 1,307.0 |
| Total | 1,340.1 | 2,187.1 | 2,170.9 | 16.2 | 3,066.1 | 298.3 | 1,427.7 |
| Lb./hr | 132,656 | 13,469 | 11,987 | 1,482 | 281,501 | 12,904 | 135,941 |
| Mol. Wt | 99.0 | 6.2 | 5.5 | 91.8 | 91.8 | | 95.2 |
| B.p.s.d | 11,090 | | | 130 | 24,374 | 1,293 | 11,709 |
| Lb/gal | 6.86 | | | 6.51 | 6.57 | 4.45 | 6.62 |
| $10^6$ s.c.f.d | | 19.9 | 19.8 | | | 0.9 | |

It is to be noted that if chiller 37 is operated to produce a separator 38 temperature of 60° F., over 15 mols per hour of hydrocarbons are recovered as valuable products. This recovery of hydrocarbons, of course, represents a significant increase in hydrogen purity which is yielded from the system via line 39. In addition, since separator 38 operates at a pressure substantially the same as absorber 31, this purified hydrogen gas stream is available at a significantly higher pressure than a single stream produced from prior art schemes which may utilize the low pressure reforming technique. It is believed that this absorber-cooling technique, according to this invention, may save from $10,000 to $15,000 per year in operating expenses for fuel and significant savings per year for operating expenses for motive power to drive major pumps.

Example II

The typical prior art scheme previously referred to separates the effluent from the reforming reaction zone into a hydrogen fraction and a liquid product-containing fraction. The hydrogen fraction is then compressed and returned to the reaction zone. The reformed hydrocarbons are recovered from the liquid product usually by fraction. For comparative purposes, the following data is presented to show the conditions of operation for a typical prior art scheme and the conditions produced by operating the present invention. For ease of analysis, reference may be made to the appended drawing wherein for the prior art case the material in line 16 is tied directly into line 12 for recycle purposes and directly into line 39 for yielding a net hydrogen gas. This mode of operation will then be compared with the mode of operation shown in the appended drawing which represents one embodiment of the inventive method.

| | Prior Art | | Invention | |
|---|---|---|---|---|
| Line No | 12 | 39 | 12 | 39 |
| Component, mols/hr.: | | | | |
| $H_2$ | 9,350.2 | 1,889.0 | 9,350.2 | 1,872.0 |
| $C_1$ | 776.7 | 156.9 | 755.4 | 146.2 |
| $C_2$ | 634.4 | 128.2 | 563.0 | 96.2 |
| $C_3$ | 561.9 | 113.5 | 407.2 | 44.6 |
| $iC_4$ | 149.2 | 30.2 | 80.3 | 2.0 |
| $nC_4$ | 194.4 | 39.3 | 91.2 | 0.9 |
| $iC_5$ | 91.2 | 18.4 | 30.5 | |
| $nC_5$ | 50.6 | 10.2 | 16.0 | |
| $C_6+$ | 198.9 | 40.2 | 95.0 | 9.0 |
| Total | 12,077.5 | 2,425.9 | 11,388.8 | 2,170.9 |
| Mol percent $H_2$ | 77.87 | 77.87 | 82.10 | 86.23 |
| $H_2/H_c$ | 6.0 | | 6.0 | |
| MMs.c.f.d | 109.2 | 22.1 | 103.6 | 19.7 |

Thus, the above data clearly shows that significant improvement may be obtained in mole percent hydrogen purity, to wit: about 78% for the prior art scheme and about 85% for the inventive scheme.

The practice of the present invention achieves the characteristic of economy for those operations which produce a relatively impure hydrogen off-gas stream; for example, those operations which produce hydrogen off-gas in a purity from 50% to 80% by volume and which are operated at relatively low pressures, such as from 85 to 200 p.s.i.g. through the reaction system. It is submitted, however, that the practice of the present invention will, in fact, produce significant economy of operation over the prior art scheme illustrated in virtually every instance.

PREFERRED EMBODIMENT

Therefore, from the detailed description presented hereinabove, the preferred embodiment of this invention provides an improvement in a process for catalytic reforming of hydrocarbons in the presence of hydrogen to produce high quality gasoline boiling range products wherein the hydrogen off-gas for recycle to the reaction zone is relatively high in molecular weight, the improvement which comprises the steps of: (a) introducing the hydrogen-containing effluent from the reforming reaction zone into a relatively low pressure separation zone; (b) withdrawing from said low pressure zone a gaseous stream comprising hydrogen contaminated with $C_2+$ hydrocarbons, and a liquid stream containing relatively high quality gasoline boiling range products; (c) compressing said gaseous stream to a relatively high pressure; (d) admixing the compressed gaseous stream with at least a major portion of said liquid stream of step (b); (e) introducing said admixture into a relatively high pressure separation zone; (f) withdrawing from said high pressure zone a gaseous fraction comprising hydrogen having reduced contaminant content, and a liquid fraction containing the relatively high quality gasoline boiling range products; (g) returning a portion of said gaseous fraction from the high pressure separation zone to the catalytic reforming reaction zone; (h) introducing the remaining portion of said gaseous fraction into a plural stage absorption zone in contact with a hereinafter specified lean absorber oil, said absorption zone maintained under conditions sufficient to produce a relatively pure hydrogen stream containing light hydrocarbons, and a rich absorber oil stream containing absorbed hydrocarbons; (i) passing said rich absorber oil into admixture with said major portion of the liquid stream as in step (d) for passage into said high pressure separation zone of step (e); (j) passing said relatively pure hydrogen stream of step (h) into a chilling zone under conditions sufficient to reduce the temperature of said hydrogen stream to a temperature from 0° F. to 65° F., said reduced temperature being at least 20° F. lower than the temperature of said absorption zone; (k) introducing said chilled hydrogen stream into a separation zone maintained under separation conditions sufficient to product a net hydrogen product stream, and a liquid stream containing $C_6+$hydrocarbons; (l) passing said liquid stream of step (k) and said liquid fraction of step (f) into a fractionation zone; (m) recovering from said fractionation zone a first product stream comprising light hydrocarbons, a second product stream comprising relatively high quality gasoline boiling range hydrocarbons, and a bottoms fraction comprising heavy hydrocarbons; and, (n) passing at least a major portion of said bottoms fraction into said absorption zone as the specified lean oil.

The invention claimed:
1. Method for the conversion of hydrocarbons in the presence of hydrogen which comprises:
 (a) contacting said hydrocarbons with a catalytic composite in the presence of hydrogen under conditions sufficient to produce an effluent stream containing hydrogen admixed with converted hydrocarbons;
 (b) separating said effluent at relatively low pressure into a gaseous stream comprising relatively impure hydrogen contaminated with light hydrocarbons, and a liquid stream containing converted hydrocarbons;
 (c) compressing said gaseous stream to a relatively high pressure;
 (d) admixing the compressed gaseous stream with at least a portion of said liquid stream;
 (e) separating said admixture at said relatively high pressure into a gaseous fraction comprising hydrogen having reduced contaminant content, and a liquid fraction comprising converted products and containing part of said contaminants;
 (f) introducing a portion of said gaseous fraction of step (c) into a plural stage absorption zone in contact with a hereinafter specified lean absorber oil, said absorption zone maintained under conditions sufficient to produce a relatively pure hydrogen stream containing light hydrocarbons, and a rich oil stream containing absorbed hydrocarbons;
 (g) chilling said relatively pure hydrogen stream under conditions sufficient to condense at least a portion of said light hydrocarbons thereby producing a first product stream comprising purified hydrogen;

(h) passing said condensed hydrocarbons of step (g) and said liquid fraction of step (e) into a fractionation zone under conditions sufficient to produce a second product stream comprising light hydrocarbons, a third product stream comprising converted hydrocarbons, and a bottoms stream comprising heavy hydrocarbons;

(i) returning the remaining portion of said gaseous fraction of step (e) to step (a) as at least part of said hydrogen; and (j) passing at least a major portion of said bottoms fraction of step (h) into said absorption zone as the specified lean oil.

2. Method according to claim 1 wherein said relatively high pressure is at least 50 p.s.i. greater than said relatively low pressure.

3. Method according to claim 2 wherein said relatively low pressure is from 85 p.s.i.g. to 200 p.s.i.g.

4. Method according to any one of claims 1, 2 and 3 wherein said cooling conditions of step (g) include a temperature from 0° F. to 65° F., said temperature being at least 20° F. cooler than the temperature maintained in said absorption zone.

5. In a process for catalytic reforming of hydrocarbons in the presence of hydrogen to produce high quality gasoline boiling range products wherein the hydrogen off-gas for recycle to the reaction zone is relatively high in molecular weight, the improvement which comprises the steps of:

(a) introducing the hydrogen-containing effluent from the reforming reaction zone into a relatively low pressure separation zone;

(b) withdrawing from said low pressure zone a gaseous stream comprising hydrogen contaminated with $C_2+$ hydrocarbons, and a liquid stream containing relatively high quality gasoline boiling range products;

(c) compressing said gaseous stream to a relatively high pressure;

(d) admixing the compressed gaseous stream with at least a major portion of said liquid stream of step (b);

(e) introducing said admixture into a relatively high pressure separation zone;

(f) withdrawing from said high pressure zone a gaseous fraction comprising hydrogen having reduced contaminant content, a liquid fraction containing the relatively high quality gasoline boiling range products;

(g) returning a portion of said gaseous fraction from the high pressure separation zone to the catalytic reforming reaction zone;

(h) introducing the remaining portion of said gaseous fraction into a plural stage absorption zone in contact with a hereinafter specified lean absorber oil, said absorption zone maintained under conditions sufficient to produce a relatively pure hydrogen stream containing a relatively pure hydrogen stream containing light hydrocarbons, and a rich absorber oil stream containing absorbed hydrocarbons;

(i) passing said rich absorber oil into admixture with said major portion of the liquid stream as in step (d) for passage into said high pressure separation zone of step (e);

(j) passing said relatively pure hydrogen stream of step (h) into a chilling zone under conditions sufficient to reduce the temperature of said hydrogen stream to a temperature from 0° F. to 65° F., said reduced temperature being at least 20° F. lower than the temperature of said absorption zone;

(k) introducing said chilled hydrogen stream into a separation zone maintained under separation conditions sufficient to produce a net hydrogen product stream, and a liquid stream containing $C_6+$ hydrocarbons;

(l) passing said liquid stream of step (k) and said liquid fraction of step (f) into a fractionation zone;

(m) recovering from said fractionation zone a first product stream comprising light hydrocarbons, a second product stream comprising relatively high quality gasoline boiling range hydrocarbons, and a bottoms fraction comprising heavy hydrocarbons; and (n) passing at least a major portion of said bottoms fraction into said absorption zone as the specified lean oil.

6. Method according to claim 5 wherein the conditions of said low pressure separation zone include a temperature from 60° F. to 120° F. and a pressure from 85 p.s.i.g. to 200 p.s.i.g., and the conditions in said high pressure separation zone include a temperature from 60° F. to 120° F. and a pressure from 135 p.s.i.g. to 300 p.s.i.g., said high pressure being at least 50 p.s.i. higher than said low separation zone pressure.

References Cited

UNITED STATES PATENTS

| | | | |
|---|---|---|---|
| 2,931,768 | 4/1960 | Mathy et al. | 208—101 |
| 2,985,583 | 5/1961 | Gilmore | 208—101 |
| 3,296,118 | 1/1967 | Czajkowski et al. | 208—100 |
| 3,402,122 | 9/1968 | Atwater et al. | 208—101 |
| 3,425,931 | 2/1969 | Penisten et al. | 208—101 |
| 3,431,195 | 3/1969 | Storch et al. | 208—101 |
| 3,470,084 | 9/1969 | Scott | 208—101 |

HERBERT LEVINE, Primary Examiner

U.S. Cl. X.R.

208—100, 102, 105, 138